(12) United States Patent
Ramesh et al.

(10) Patent No.: US 8,346,714 B1
(45) Date of Patent: Jan. 1, 2013

(54) TRANSACTIONTIME AND VALIDTIME TIMESTAMPING IN AN ENTERPRISE ACTIVE DATA WAREHOUSE

(75) Inventors: Bhashyam Ramesh, Secunderabad (IN); Donald Pederson, San Diego, CA (US)

(73) Assignee: Teradota US, Inc., Dayton, OH (US)

( * ) Notice: Subject to any disclaimer, the term of this patent is extended or adjusted under 35 U.S.C. 154(b) by 231 days.

(21) Appl. No.: 12/640,103

(22) Filed: Dec. 17, 2009

(51) Int. Cl.
G06F 7/00 (2006.01)
G06F 17/00 (2006.01)
(52) U.S. Cl. ....................................................... 707/600
(58) Field of Classification Search .......................... None
See application file for complete search history.

(56) References Cited

U.S. PATENT DOCUMENTS

| 5,819,251 | A * | 10/1998 | Kremer et al. ........................ 1/1 |
| 7,236,971 | B1 * | 6/2007 | Shatdal et al. ........................ 1/1 |
| 7,263,536 | B1 * | 8/2007 | Pederson ............................... 1/1 |
| 7,818,349 | B2 * | 10/2010 | Frost ............................. 707/802 |
| 7,912,834 | B2 * | 3/2011 | Gupta et al. .................... 707/717 |
| 8,010,554 | B1 * | 8/2011 | Zhou .............................. 707/769 |
| 2003/0187862 | A1 * | 10/2003 | Brobst ............................ 707/102 |
| 2004/0205062 | A1 * | 10/2004 | Brown et al. ...................... 707/3 |
| 2008/0147603 | A1 * | 6/2008 | Kostamaa et al. ................. 707/3 |
| 2008/0201295 | A1 * | 8/2008 | Praveena et al. .................. 707/2 |
| 2008/0307055 | A1 * | 12/2008 | Waters .......................... 709/206 |
| 2009/0299987 | A1 * | 12/2009 | Willson ............................ 707/4 |
| 2010/0057796 | A1 * | 3/2010 | Brown et al. .................. 707/715 |
| 2010/0153429 | A1 * | 6/2010 | Xu et al. ........................ 707/769 |
| 2010/0153958 | A1 * | 6/2010 | Richards et al. ............. 718/104 |

* cited by examiner

Primary Examiner — Usmaan Saeed
(74) Attorney, Agent, or Firm — Howard Speight (57) ABSTRACT

A temporal table is present in an active data warehouse ("ADW") on a massively parallel processing system ("MPP system"). The MPP system includes a plurality of units of parallelism. Each of the plurality of units of parallelism maintains its own moving system time separate from that of the other units of parallelism. A load-job for the ADW is accepted. The load-job includes a requested modification to an identified row. The identified row is stored in the temporal table on a first of the MPP system's units of parallelism. The requested modification is implemented on the identified row. The identified row is timestamped with the moving system time maintained by the first of the MPP system's units of parallelism at the time of the implementation of the modification.

17 Claims, 4 Drawing Sheets

TRANSACTIONTIME AND VALIDTIME TIMESTAMPING IN AN ENTERPRISE ACTIVE DATA WAREHOUSE

BACKGROUND

Literature on temporal databases typically suggests using the end time of a transaction, or the time that the transaction is committed, as the fixed value for timestamping rows associated with a transaction. In such a scheme, all modifications associated with a transaction appear to occur at the same time and the rows modified by the transaction are only visible after the transaction is committed. During the life of the transaction and before its commit, the begin time of the transaction is used as a temporary value for the time stamp. Other literature proposes using the transaction begin time as the time stamp. Either type of timestamping is challenging when the temporal database is an active data warehouse ("ADW").

SUMMARY

In general, in one aspect, the invention features a method for timestamping in a temporal table in an active data warehouse ("ADW") on a massively parallel processing system ("MPP system"). The MPP system includes a plurality of units of parallelism. Each of the plurality of units of parallelism maintains its own moving system time separate from that of the other units of parallelism. The method includes accepting a load-job for the ADW with a requested modification to an identified row. The identified row is stored in the temporal table on a first of the MPP system's units of parallelism. The method further includes implementing the requested modification on the identified row. The method further includes timestamping the identified row with the moving system time maintained by the first of the MPP system's units of parallelism at the time of the implementation of the modification.

Implementations of the invention may include one or more of the following. Timestamping the identified row with the moving system time maintained by the first of the MPP system's units of parallelism at the time of the implementation of the modification may include inserting the moving system time maintained by the first of the MPP system's units of parallelism into a TransactionTime column of the identified row. The temporal table may be bi-temporal, having the TransactionTime dimension and a ValidTime dimension. The ValidTime dimension may record the time period when a row in the temporal table is valid. The method may include executing a query against the temporal table. The query may include a predicate to be applied to the ValidTime dimension. The method may further include applying the predicate to the TransactionTime dimension. Applying the predicate to the TransactionTime dimension may be performed to resolve issues occurring when applying the predicate to the ValidTime dimension. Inserting the moving system time maintained by the first of the MPP system's units of parallelism into a TransactionTime dimension of the identified row may include inserting the moving system time maintained by the first of the MPP system's units of parallelism into a begin time field of the TransactionTime dimension of the identified row. Inserting the moving system time maintained by the first of the MPP system's units of parallelism into a TransactionTime dimension of the identified row may include inserting the moving system time maintained by the first of the MPP system's units of parallelism into an end time field of the TransactionTime dimension of the identified row. Accepting the requested modification may include accepting multiple modifications to the identified row within a time less than a finest granularity provided by the system time maintained by the first of the MPP system's units of parallelism and generating an artificial finer granularity for the system time maintained by the first of the MPP system's units of parallelism to use as respective time stamps for successive modifications of the multiple modifications to the identified row within a time less than the finest granularity available from the system time maintained by the first of the MPP system's units of parallelism. The temporal table may include a ValidTime dimension. The requested modification may be required to include an entry for the ValidTime dimension. The temporal table may be bi-temporal having a TransactionTime field. The method may include identifying the identified row using the TransactionTime field.

In general, in another aspect, the invention features a database system. The database system includes a massively parallel processing system ("MPP system"). The MPP system includes a plurality of units of parallelism. Each of the plurality of units of parallelism maintains its own moving system time separate from that of the other units of parallelism. The MPP further includes a plurality of CPUs. Each of the units of parallelism provides access to one or more CPUs. The MPP further includes a plurality of virtual processes. Each of the one or more CPUs provides access to one or more virtual processes. Each virtual process is configured to manage data, including rows from the set of database table rows, stored in one of a plurality of data-storage facilities. The MPP further includes a process to accept a load-job for the ADW with a requested modification to an identified row. The identified row is stored in the temporal table on a first of the MPP system's units of parallelism. The process further implements the requested modification on the identified row. The process further timestamps the identified row with the moving system time maintained by the first of the MPP system's units of parallelism at the time of the implementation of the modification.

In general, in another aspect, the invention features a computer program, stored in a computer-readable tangible medium, for execution in an active data warehouse ("ADW") on a massively parallel processing system ("MPP system"). The MPP system includes a plurality of units of parallelism. Each of the plurality of units of parallelism maintains its own moving system time separate from that of the other units of parallelism. The program includes executable instructions that cause a computer to accept a load-job for the ADW with a requested modification to an identified row. The identified row is stored in the temporal table on a first of the MPP system's units of parallelism. The program further includes executable instructions that cause the computer to implement the requested modification on the identified row. The program further includes executable instructions that cause the computer to timestamp the identified row with the moving system time maintained by the first of the MPP system's units of parallelism at the time of the implementation of the modification.

DETAILED DESCRIPTION

Figure 1:
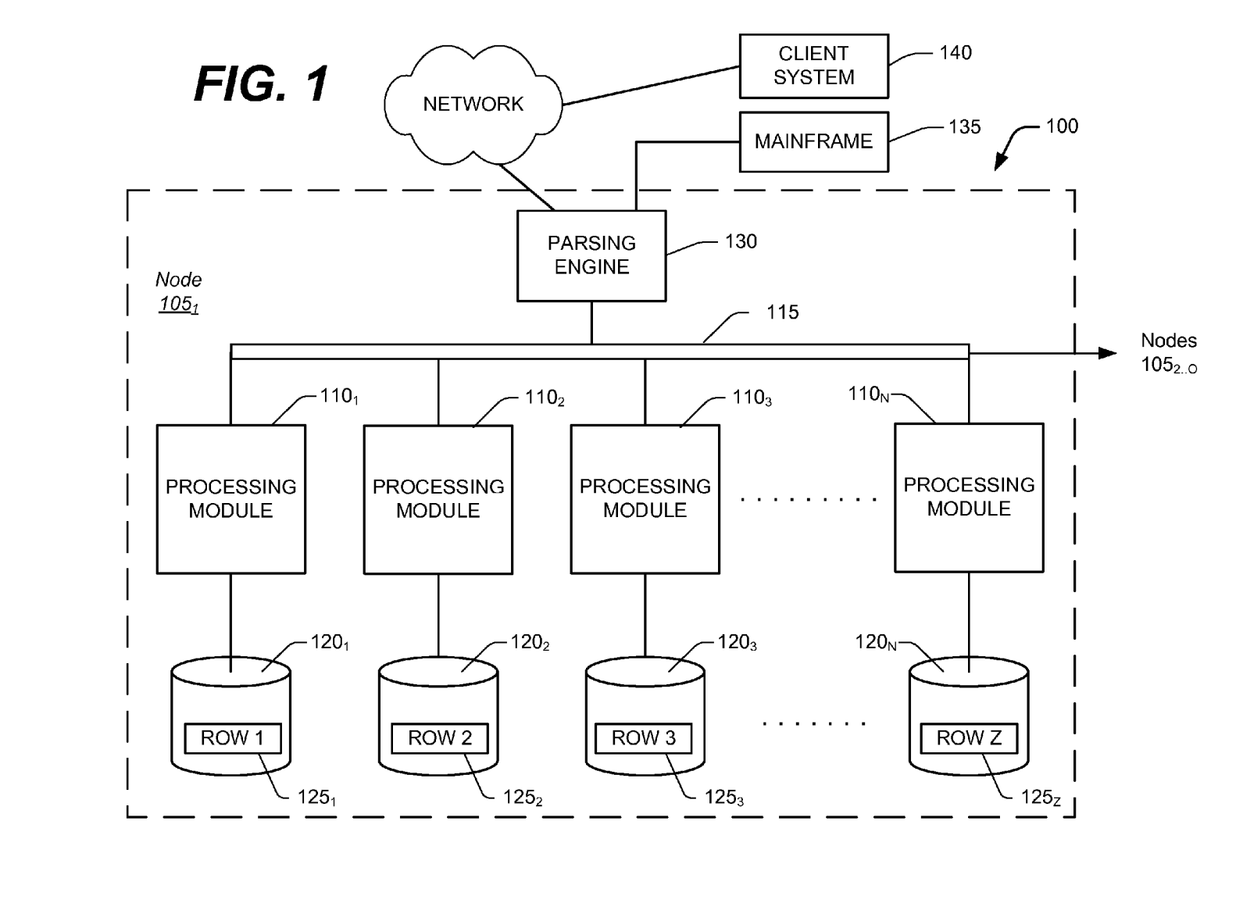
FIG. 1 is a block diagram of a node of a database system.

The timestamping technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_1 \ldots N$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
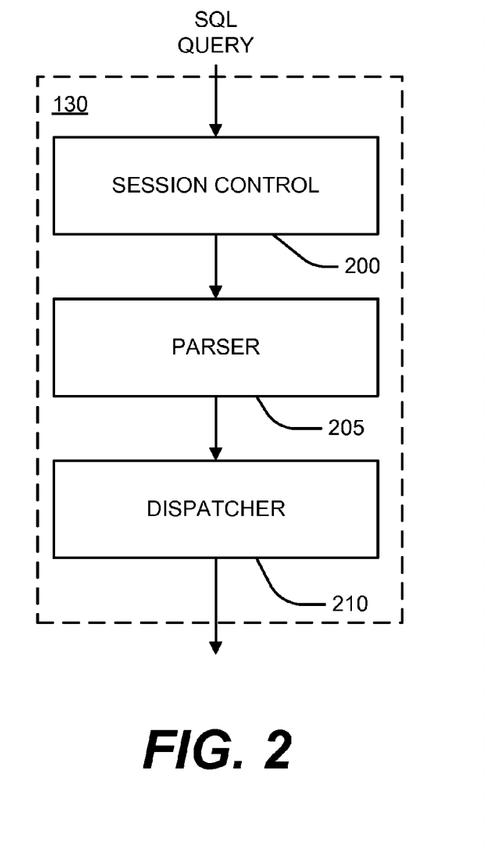
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
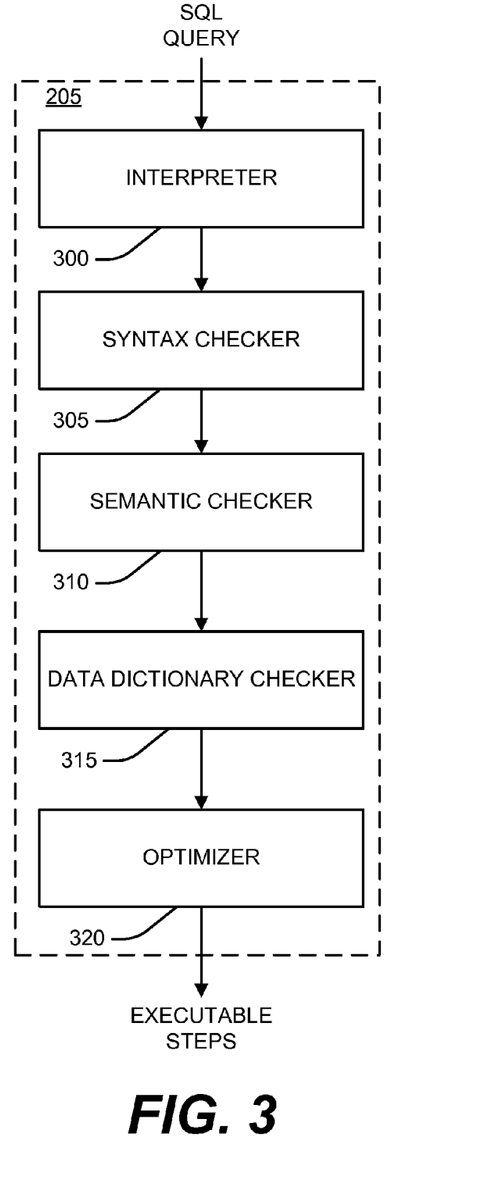
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

A temporal database management system is defined to be a database management system with built-in support for reasoning with time such as a temporal data model, temporal constraints, and a temporal version of SQL.

A temporal database is defined to be a database capable of inherently storing data (i.e., without the use of user-defined date or timestamp columns, or the like) that relates to time instances. Such a database provides temporal data types and stores information related to the past, present, and future. For example, such a temporal database might store an inventory history or the movement of employees within an organization. While a conventional database can maintain temporal data, it is typically done using user-defined date or timestamp columns, or the like, which are maintained in a temporal manner.

In one embodiment, there are three different fundamental kinds of time in a temporal database. The first type is user-defined times that are un-interpreted time values. Such times typically are defined as DateTime data types or Period data types.

In one embodiment, DateTime data types are conventional types. In one embodiment, Period data types define a time period and include a beginning element that defines the beginning of the time period and an ending element that defines the end of the time period.

In one embodiment, the second fundamental kind of time in a temporal database is ValidTime, which is typically defined as a Period data type with an element type of DATE or TIMESTAMP, and which is defined to denote the time period during which a fact (typically represented as a row in a table) is true (or valid) with respect to the real world. In one embodiment, ValidTime is defined as two DateTime columns, one DateTime column denoting the beginning of the time period and the other DateTime column denoting end of the time period.

In one embodiment, the third fundamental kind of time in a temporal database is TransactionTime, which is typically defined as a Period data type with an element type of TIMESTAMP, and which is defined to denote the time period beginning when a fact was first known (or recorded in) the database and ending when superseded by an update to the fact or when the fact is deleted. In one embodiment, TransactionTime is defined as two DateTime columns, one DateTime column denoting the beginning of the time period and the other DateTime column denoting end of the time period.

In one embodiment, the ValidTime and TransactionTime period values do not have to be the same for a row. In one embodiment, the three kinds of time are orthogonal. That is, a table can have one, two, or all three kinds of time, each providing a different dimension for reasoning on time.

A ValidTime table is defined to be a table that has ValidTime but not TransactionTime.

A TransactionTime table is defined to be a table that has TransactionTime but not ValidTime.

A bi-temporal table is defined to be a table that has both ValidTime and TransactionTime.

A temporal table is defined to be a table that has ValidTime and/or TransactionTime.

A non-temporal table is defined to be a table that has neither ValidTime nor TransactionTime.

In one embodiment, as is conventional, there are four forms or variants of temporal statements: current, sequenced, non-sequenced, and AS OF. A temporal statement of the current form is defined to be a statement that works with the current snapshot of data. A temporal statement of the sequenced form is defined to be a statement that considers the table as a sequence of snapshot states and works with each state of the data independently. A sequenced form can optionally specify the period of interest for the sequenced operation. This period of interest is called the period of applicability. A temporal statement of the non-sequenced type ignores the time dimensions for data and works across all the snapshot states simultaneously. An AS OF statement uses a snapshot of data as of the date or timestamp identified in the AS OF clause.

In one embodiment, a row in a ValidTime table can be a current row, a future row, or a history row. A current row is defined to be a row in which its ValidTime period overlaps current time. A future row is defined to be a row in which the begin time of its ValidTime period is in the future with respect to current time. A history row is defined to be a row in which the end time of its ValidTime is in the past with respect to current time. A valid row is defined to be a current row or a future row. A no-longer-valid row is defined to be a history row. A special case of ValidTime period being NULL is defined in which a row does not qualify as a current row, future row, or history row.

A row in a table with TransactionTime (i.e., a Transaction-Time table or a bi-temporal table) can be an open row or a closed row. An open row is defined to be a row in which the TransactionTime end time is UNTIL_CLOSED. A closed row is a row in which the TransactionTime end time is not UNTIL_CLOSED (i.e., the row is closed in Transaction-Time). In one embodiment, the UNTIL_CLOSED literal has a value associated with a time far in the future, such as the year 9999.

In a TransactionTime table, an open row is also called a current row and a closed row is also called a history row. In one embodiment, there is not concept of a future row in the TransactionTime dimension because the system maintains the TransactionTime column such that a TransactionTime begin time is never in the future and a TransactionTime end time is either UNTIL_CLOSED or in the past.

In one embodiment, a row in a bi-temporal table can be a current row, a future row, or a history row. A current row is defined to be an open row in which the ValidTime period overlaps current time. A future row is an open row in which the ValidTime begin time is in the future with respect to current time. A valid row is a row in which the ValidTime period overlaps current time or in which the ValidTime begin time is in the future with respect to current time. All rows that are either not open in TransactionTime or not valid in Valid-Time are called history rows. An open but no-longer-valid row, a valid but closed row, and a neither valid nor open row are all history rows. In one embodiment, a row is not considered a current, future, or history row if the ValidTime period is null.

In one embodiment, all rows in a ValidTime table are considered to be open rows in the TransactionTime dimension and, therefore, the definition of a current, future, or history row is the same as for a bi-temporal table. Further, in one embodiment all rows in a TransactionTime table are considered to overlap current time in the ValidTime dimension and, therefore, the definition of a current or history row is the same as for a bi-temporal table. In addition, the definition of a valid or no-longer-valid row is the same for all three kinds of temporal tables.

A DML statement is defined to be a statement such as INSERT or UPDATE statements that adds, modifies, or deletes table rows, and does not include the SQL SELECT statement.

A current query (i.e., a SQL SELECT statement) or a current DML statement operates on the current rows of a table. A current constraint operates on current and future rows of a table.

A single modification DML statement, such as an UPDATE, INSERT, or DELETE, issued on a temporal table may map to more than one SQL operation on the table. For example, an update on a bi-temporal table may lead to one update and multiple inserts. The actual number of operations depends on the temporal content of the row. Therefore this mapping is one-to-many. The mapping is not constant. It depends on the validity of the row and the number of time dimensions—ValidTime, TransactionTime or both.

For example, a user issued CURRENT VALIDTIME DELETE on a ValidTime table maps to an update on current rows. The ValidTime portion starting from current time is deleted. If the ValidTime starts at current time then the row is deleted. A user issued SEQUENCED VALIDTIME DELETE on a ValidTime table without a period of applicability deletes the row. With a period of applicability this operation deletes the period of applicability portion from the ValidTime of the row and therefore can result in some combination of an update, delete and insert. Consider the ValidTime table named Employee_Salary shown in Table 1 (note that the dates are shown in mm-dd-yyyy format and, for simplicity of presentation, do not include time information; it will be understood that other formats are possible and that more precise time information can be included):

TABLE 1

| Employee_ID | Salary | Job_Duration (ValidTime) |
|---|---|---|
| 1001 | 50000 | Jan. 1, 2007, Jan. 1, 2008 |
| 1001 | 55000 | Jan. 1, 2008, Jan. 1, 2009 |
| 1001 | 57000 | Jan. 1, 2009, UNTIL_CHANGED |

Assuming that the current date is sometime during 2008, Table 1 indicates that employee 1001's salary was $50,000 during 2007, is $55,000 during 2008, and is scheduled to increase to $57,000 during 2009. The first row is a history row, the second row is a current row, and the third row is a future row. Assume the following DML statement is executed on Jul. 1, 2008:

SEQUENCED VALIDTIME PERIOD(CURRENT_DATE, UNTIL_CHANGED)

DELETE FROM Employee_Salary WHERE Employee_ID=1001;

To execute this statement in one embodiment, no change is required to the first row, the second row is updated to show the deletion date, and the third row is deleted producing the result in Table 2:

TABLE 2

| Employee_ID | Salary | Job_Duration (ValidTime) |
|---|---|---|
| 1001 | 50000 | Jan. 1, 2007, Jan. 1, 2008 |
| 1001 | 55000 | Jan. 1, 2008, Jul. 1, 2008 |

A user issued CURRENT VALIDTIME UPDATE on a ValidTime table maps to an update and insert on current rows. A user issued SEQUENCED VALIDTIME <period of applicability> UPDATE on a ValidTime table maps to an update, on the rows whose ValidTime overlaps with the specified PA, for the overlapped portion and inserts for the non-overlapping portions of the ValidTime value. Considering again the ValidTime table in Table 1 above, assume the following DML statement is executed on Jul. 1, 2008. Assume that we wish to increase the salary from 2009 to $60,000.

SEQUENCED VALIDTIME
PERIOD(DATE '2009-01-01', UNTIL_CHANGED)
UPDATE Employee_Salary
SET Salary='60000'
WHERE Employee_ID='1001'

To execute this statement in one embodiment, no change is required to the first row, an update and an insert is required on the second row and an update is required on the third row, producing the result in Table 3:

TABLE 3

| Employee_ID | Salary | Job_Duration (ValidTime) |
|---|---|---|
| 1001 | 50000 | Jan. 1, 2007, Jan. 1, 2008 |
| 1001 | 55000 | Jan. 1, 2008, Jan. 1, 2009 |
| 1001 | 60000 | Jan. 1, 2009, UNTIL_CHANGED |

A user issued CURRENT VALIDTIME UPDATE on a bi-temporal table maps to an update and up to two inserts on current rows. A user issued SEQUENCED VALIDTIME <period of applicability> UPDATE on a bi-temporal table maps to an update, on open rows whose ValidTime overlaps with the specified PA, to close the open row and inserts multiple rows for the overlapped and non-overlapping ValidTime portions. Consider the bi-temporal table named Employee_Salary_Bi_Temporal shown in Table 4:

TABLE 4

| Employee_ID | Salary | Job_Duration (ValidTime) | TransactionTime |
|---|---|---|---|
| 1001 | 50000 | Jan. 1, 2007, UNTIL_CHANGED | Jan. 1, 2007, UNTIL_CLOSED |

Assume the following DML statement is executed on Sep. 15, 2007:

SEQUENCED VALIDTIME PERIOD(01-01-2008,UNTIL_CHANGED)
UPDATE Employee_Salary_Bi_Temporal
SET Salary='55000'
WHERE Employee_ID='1001';

To execute this statement in one embodiment, the single row is updated and two new rows are inserted:

TABLE 5

| Employee_ID | Salary | Job Duration (ValidTime) | TransactionTime |
|---|---|---|---|
| 1001 | 50000 | Jan. 1, 2007, UNTIL_CHANGED | Jan. 1, 2007, Sep. 15, 2007 |
| 1001 | 50000 | Jan. 1, 2007, Jan. 1, 2008 | Sep. 15, 2007, UNTIL_CLOSED |
| 1001 | 55000 | Jan. 1, 2008, UNTIL_CHANGED | Sep. 15, 2007, UNTIL_CLOSED |

In Table 5, the first row is now a history row (i.e., because it is a closed row in the TransactionTime dimension), the second row is a current row until 01-01-2008 when it becomes a history row, and the third row is a future row until 01-01-2008 when it becomes a current row.

Now assume the following DML statement is executed on Oct. 1, 2008:

SEQUENCED VALIDTIME
PERIOD (Date '2009-01-01', UNTIL_CHANGED)
UPDATE Employee_Salary_Bi_Temporal
SET Salary='57000'
WHERE Employee_ID='1001';

On Oct. 1, 2008 at the time of execution of the DML statement, the first two rows of the Employee_Salary_Bi_Temporal table, whose current status is shown in Table 5, are history rows and the third row is the qualified row whose ValidTime overlaps with the specified period-of-applicability and is an open row. To execute this DML statement in one embodiment, the first two rows are not changed, the third row is updated and two new rows are inserted:

TABLE 6

| Employee_ID | Salary | Job_Duration (ValidTime) | TransactionTime |
|---|---|---|---|
| 1001 | 50000 | Jan. 1, 2007, UNTIL_CHANGED | Jan. 1, 2007, Sep. 15, 2007 |
| 1001 | 50000 | Jan. 1, 2007, Jan. 1, 2008 | Sep. 15, 2007, UNTIL_CLOSED |
| 1001 | 55000 | Jan. 1, 2008, UNTIL_CHANGED | Sep. 15, 2007, Oct. 1, 2008 |
| 1001 | 55000 | Jan. 1, 2008, Jan. 1, 2009 | Oct. 1, 2008, UNTIL_CLOSED |
| 1001 | 57000 | Jan. 1, 2009, UNTIL_CHANGED | Oct. 1, 2008, UNTIL_CLOSED |

In Table 6, the first three rows are history rows (the first and third rows because they are closed in the TransactionTime dimension, and the second row because the Job_Duration period does not overlap the current time), the fourth row is a current row until 01-01-2009 when it becomes a history row, and the fifth row is a future row until 01-01-2009 when it becomes a current row.

Now assume the following DML statement is executed on Oct. 10, 2008:

SEQUENCED VALIDTIME
PERIOD (Date '2009-01-01', UNTIL_CHANGED)
UPDATE Employee_Salary_Bi_Temporal
SET Salary='60000'
WHERE Employee_ID='1001';

To execute this DML statement in one embodiment, the first four rows are not changed, the fifth row is updated and a new row is inserted:

TABLE 7

| Employee_ID | Salary | Job_Duration (ValidTime) | TransactionTime |
|---|---|---|---|
| 1001 | 50000 | Jan. 1, 2007, UNTIL_CHANGED | Jan. 1, 2007, Sep. 15, 2007 |
| 1001 | 50000 | Jan. 1, 2007, Jan. 1, 2008 | Jan. 1, 2007, UNTIL_CLOSED |

TABLE 7-continued

| Employee_ID | Salary | Job_Duration (ValidTime) | TransactionTime |
|---|---|---|---|
| 1001 | 55000 | Jan. 1, 2008, UNTIL_CHANGED | Sep. 15, 2007, Oct. 1, 2008 |
| 1001 | 55000 | Jan. 1, 2008, Jan. 1, 2009 | Oct. 1, 2008, UNTIL_CLOSED |
| 1001 | 57000 | Jan. 1, 2009, UNTIL_CHANGED | Oct. 1, 2008, Oct. 10, 2008 |
| 1001 | 60000 | Jan. 1, 2009, UNTIL_CHANGED | Oct. 10, 2008, UNTIL_CLOSED |

Temporal Transactions

In one embodiment, temporal transactions (a) qualify rows based upon the time dimensions, (b) store in the qualified rows, in addition to the modification, the time when the modification took place (i.e., the "timestamp"), and (c) query the time when the rows were modified.

In one embodiment, the temporal transaction timestamping technique described herein provides timestamping that reflects the order in which the data is entered into the database. In one embodiment, the technique provides both read lock and access lock consistency that is upward compatible with ADW applications and is relevant for the TransactionTime dimension, which is an appropriate level of upward compatibility for ADW.

The temporal transaction timestamping technique described herein also recognizes that MPP system nodes can have different system times. In one embodiment, the technique does not use global timing, which can limit parallelism, but instead uses node level times.

In one embodiment, the technique uses site level timestamping for TransactionTime rather than source level timestamping. In one embodiment, ValidTime timestamping is source level but is resolved for correctness using a TransactionTime timestamp value. In one embodiment, this is accomplished by using the TransactionTime as a reference (or comparison).

Timestamping

In temporal transactions, the semantics of time used to qualify a row in the time dimension are consistent with the timestamp value stored in the row for the two time dimensions.

In one embodiment, built-in functions TEMPORAL_DATE and TEMPORAL_TIMESTAMP (collectively, the TEMPORAL_TS functions) are defined. Note that these built-in functions are named to avoid confusion with timestamp values CURRENT_DATE and CURRENT_TIMESTAMP. CURRENT_DATE and CURRENT_TIMESTAMP change with the passage of time even within the same transaction. In contrast, the TEMPORAL_TS functions are determined once and kept the same during the life of the transaction.

In one embodiment, the TEMPORAL_TS built-in functions are used to qualify the ValidTime ("VT") and TransactionTime ("TT") dimensions. In one embodiment, the system will rewrite a user query to include predicates on the time dimensions using the TEMPORAL_TS functions. In one embodiment, these rewrites make the time dimensions linear and enable the existing database infrastructure to process temporal queries. The TEMPORAL_TS variables are replaced with an appropriate value when the built-in functions are executed. In one embodiment, the values of the TEMPORAL_TS variables can be displayed and can be used explicitly in queries.

In one embodiment, the system puts a timestamp value on the TransactionTime and ValidTime columns during modifications. In one embodiment, this is called timestamping a row. In one embodiment, timestamping a TransactionTime column is performed by the system to indicate when the system "knew" about the row. In one embodiment, the user does not have control over the timestamp value used for the TransactionTime column. In one embodiment, the ValidTime column is different because it models the user environment. In one embodiment, the ValidTime column is used to represent the validity of the information encoded in a row. In one embodiment, it is meaningful for the user to specify the timestamping value for the ValidTime column. In one embodiment, if the user does not specify a value, the system selects a default value. In one embodiment, the default value selection for a ValidTime column value during modification is also called timestamping a row. In one embodiment, the ValidTime timestamping value is only an approximation. This ValidTime value can create inconsistencies, as will be shown. References to timestamping the TransactionTime column and timestamping the ValidTime column are differentiated herein through context.

Active Data Warehouses and ADW Load-Jobs

In one embodiment, an ADW is not a transactional database. In one embodiment, it is a database that can perform Decision Support System ("DSS") workloads and operational workloads, i.e., analytical work that is response-time sensitive.

An ADW is typically loaded from another database. Transactions are typically captured by the other database and collected into a batch. The batch is typically loaded into the ADW using, for example, a load utility. This batching of transactions and loading batches into the ADW is done periodically (although the period need not be regular; that is, the time between loads may vary), with the period and the size of the batch being based on the customer requirements for the freshness of data in the ADW. This process of loading a batch of transactions into the ADW is referred to herein as a "load-job" or "ADW load-job."

In one embodiment, the concept of "transaction" is different in an ADW than in the database from which the ADW was loaded. In one embodiment, the boundaries of an ADW load-job are artificial. In one embodiment, they are not constrained to actual customer transaction boundaries. In one embodiment, they do not align with actual customer transaction boundaries. In one embodiment, statements that belong to different customer transactions lie within a single ADW load-job. In one embodiment, statements that belong to the same customer transaction cross ADW load-job boundaries. In one embodiment, the changes expressed in an ADW load-job are tracked in the database.

TransactionTime Timestamping

In traditional transaction semantics, the TransactionTime timestamping value is fixed throughout the life of the transaction as the commit time of the transaction. Prior to transaction commit, a temporary value of transaction begin time can be used as the temporary timestamping value for all modifications of a row. In one embodiment, a different technique is used to apply a time stamp to the TransactionTime field in an ADW.

In one embodiment, a transaction in an ADW has the same semantics on the TransactionTime dimension as an ADW load-job. A transaction is often thought of as capturing a set of operations in order to model some real world occurrence. In the real world, the occurrence often happens as an atomic action. For example, the occurrence may be that a customer goes to a branch of a bank and opens the account with an initial deposit. In one embodiment, opening the account and making the initial deposit is considered a single transaction.

In one embodiment, such a transaction is stored in a database at the bank as a single transaction.

Continuing the example, the customer may perform other actions while at the bank, such as acquiring a cashier's check. These additional interactions may or may not be stored in the bank's database as part of the original transaction in which the account was opened and a deposit is made. However, in one embodiment if the customer returns in a few hours to make a deposit into the account, that activity would be stored as a different transaction in the bank's database. Further, in one embodiment, if the customer returns that same day and closes the account, that activity would be stored as yet another transaction in the bank's database.

In one embodiment, a data warehouse, such as an ADW, is loaded periodically and is not the same as an on line transaction processing ("OLTP") system (the bank's database in the discussion above is an example of an OLTP system). In one embodiment, an ADW is loaded periodically by collecting all transactions that occurred during a time period. In one embodiment, that time period is a few minutes. In one embodiment, that time period is a few hours. In one embodiment, that time period is a few days.

In one embodiment, an ADW is loaded more frequently than a DSS. In one embodiment, this ADW load-job includes multiple real-world transactions. Using the example described above, in one embodiment if the ADW load period is a few minutes, the transactions described above would appear in three different ADW load-jobs: (1) the customer opening the account and making the initial deposit; (2) the customer making the second deposit; and (3) the customer closing the account. If, in one embodiment, the ADW load period is a few hours, items (1) and (2) would appear in the same ADW load-job and item (3) would appear in a second ADW load-job. If, in one embodiment, the ADW load period is a few days, all three items would appear in the same ADW load-job.

In one embodiment, the atomicity of a transaction is artificial for an ADW load-job. If atomicity is enforced, all operations in a transaction appear to occur at the same time or not at all.

In one embodiment, such a requirement would be inconsistent with the nature of an ADW load-job, in which all of the modifications have already been committed in the database from which the ADW load-job was loaded. In one embodiment, the atomicity requirement is not enforced for ADW load-jobs.

In one embodiment the TransactionTime timestamping value for an ADW load-job enables the ADW to track all changes within an ADW load-job. In one embodiment, the time value in the system at the instant the user requested modification on a row is used as a timestamping value.

To illustrate, consider the following examples. Assume that the following three transactions that overlap in time are run against a temporal database:

Transaction 1:

| | |
|---|---|
| 10:00 am: | Log in |
| 10:30 am: | Access temporal customer account table to create customer's account with balance $0.00 |
| 12:00 pm: | Access temporal customer account table to change the balance in the customer's account to $100.00 |
| 12:30 pm | Log out |

Transaction 2:

| | |
|---|---|
| 11:00 am: | Log in |

-continued

| | |
|---|---|
| 11:15 am: | Access temporal customer account table to read customer's account balance is $0.00 |
| 12:45 pm: | Log out |

Transaction 3:

| | |
|---|---|
| 12:00 pm: | Log in |
| 12:15 pm: | Access temporal customer account table to read customer's account balance is $100.00 at 12:15 pm |
| 12:16 pm: | Log out |

The begin time of Transaction 1 is 10:00, the time the transaction began. The commit time of Transaction 1 is 12:30, the time the transaction ended. If either begin time timestamping or commit time timestamping are used, the 10:30 am operation of Transaction 1 will not be recorded in the ADW because the 12:00 pm operation will modify the same physical row of the ADW as the 10:30 am operation. This is normally how modifications within the same transaction are defined.

The begin time of Transaction 2 is 11.00 am and the commit time of Transaction 2 is 12:45 pm.

The begin time of Transaction 3 is 12:00 pm and the commit time of Transaction 3 is 12:16 pm.

If begin-time timestamping is used, Transaction 1, showing a balance of $100.00, would be timestamped at 10:00 am and Transaction 2, showing a balance of $0.00, would be shown as having read the balance of $0.00 at 11:15, which erroneously indicates that the customer's balance decreased from $100.00 to $0.00 in the interval from 10:00 am to 11:15 am.

Similarly, if commit-time timestamping is used, Transaction 3 would show a balance of $100 and Transaction 1 would show a deposit of $100.00 at 12:30 which, erroneously, would indicate an increase in balance to $200.00, but Transaction 1 shows a balance of only $100.00.

While the time intervals illustrated above for Transactions 1, 2, and 3 are relatively long, they are not unreasonable. For example, the customer account table may be locked by another process during the period from 10:30 am to 11:59 pm, or the customer may have established the account at 10:30 am and then finished the transaction with a deposit after a break, say for lunch, at 11:59 pm. Further, a transaction may be split between load jobs. For example the 10:30 modification in Transaction 1 may be in a different load-job than the 12:00 modification. It can readily be understood that much small time intervals could produce the same kind of inconsistency.

The begin time of the transaction can have many meanings. In one embodiment it can be the time when the user starts the transaction. For example, Transaction 1 began at 10:00 am and 10:00 am will be the timestamp value for use with the begin-time timestamping approach explained above. Another embodiment may attempt to reduce the problem explained above with respect to begin-time timestamping approach. It may attempt to do this by using a timestamp value that is slightly later than the actual starting time of the transaction but before the actual modification time. One such time could be the first non-locking step (i.e., the first step that does more than simply locking any table that is being accessed). In Transaction 1 above that would be 10:30 am; i.e. 10:30 am will be considered as the timestamp value for the begin-time timestamping approach.

In an ADW where multiple changes could be loaded as part of the same transaction neither begin-time nor end-time will work i.e. besides the problems explained above. The following example illustrates another example of an issue:

| Transaction 4: | |
|---|---|
| 10:00 am: | Log in |
| 10:30 am: | Access temporal customer account table and set customer's account balance to $200.00 (the customer walked in at 10:30 to deposit money) |
| 11:00 am: | Access temporal customer account table to change the balance in the customer's account to $50.00 (e.g., the customer withdrew $150) |
| 12:30 pm: | Log out |

Two changes are performed in Transaction 4—one to set the balance to $200.00 and another to set the balance to $50.00 as the result of, for example, a withdrawal of $150.00. What will actually result in case both changes are loaded as part of the same ADW load-job is ambiguous. In one embodiment only the last change (i.e., the 11:00 am modification) will be recorded. In such a case the ADW will not track modifications prior to the last modification. In one embodiment, if care is taken to record all changes then both modifications will have the same timestamp value—in the case of begin-time timestamping both changes will show 10:00 am and in the case of end-time timestamping both changes will show 12:30 pm. This will make it hard to determine what happened.

One embodiment of the technique described herein enables tracking by setting the timestamp value when the modification is recorded in the ADW. For example, in the case of Transaction 4, the modification setting the customer's account balance to $200.00 will be given a timestamp of 10:30 am and the modification setting the customer's account balance to $50.00 will be given a timestamp of 11:00 am. In one embodiment, if the modifications happen within the same granularity of time that the hardware is capable of providing then a time increment is manufactured for the second modification. Continuing the use of Transaction 4, if the granularity of time is ½ hours (i.e., time proceeds as follows: 10:00 am, 10:30 am, 11:00 am, 11:30 am, etc.), then, in one embodiment, the modification setting the customer's account balance to $200.00 is given a timestamp of 10:30 am and the modification setting the customer's account balance to $50.00 would be given a timestamp of 10:31 am, even though the latter time reflects greater granularity than is actually available from the hardware.

In one embodiment, the system on which the ADW runs includes a plurality of units of parallelism. For example, in one embodiment of the system illustrated in FIG. 1, each of the nodes $105_{1 \ldots O}$ is a different unit of parallelism. In one embodiment of the system illustrated in FIG. 1, each processing module $110_{1 \ldots N}$ in a node is a different unit of parallelism. In one embodiment, shown generally in FIG. 4, the system 405 on which the ADW runs includes a plurality of units of parallelism $410a \ldots m$ connected by a network 415. In one embodiment, each unit of parallelism has its own clock $420a \ldots m$. In one embodiment, one of the clocks, such as clock 420a, is designated to provide a "global time" for the entire system 405. In one embodiment, each of the units of parallelism $410a \ldots m$ is an AMP in the Teradata nomenclature. A source database 425 provides ADW load-jobs for processing by the system 405 on which the ADW runs.

Figure 4:
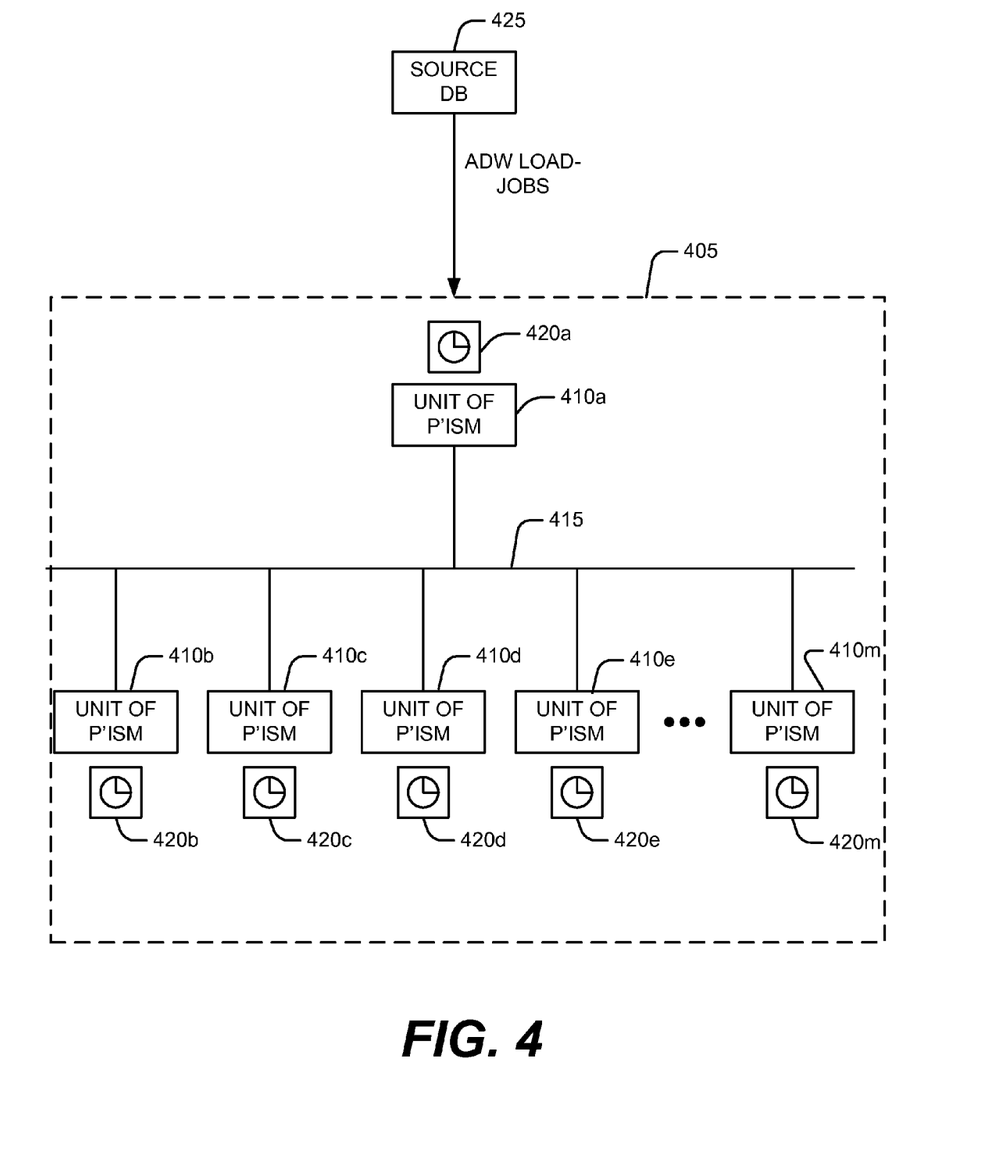
FIG. 4 is a block diagram of a system having a plurality of units of parallelism, each with its own clock.

In one embodiment, each unit of parallelism $410a \ldots m$ determines the system time, i.e., the time on its associated clock (for example clock 420b has the "system time" for unit of parallelism 410b), at the instant that the user requested modification is performed on a row in that unit of parallelism. In one embodiment, a "user requested modification" is a user request such as a SQL UPDATE, DELETE, UPSERT, MERGE INTO, INSERT, or the like. In one embodiment, an ADW load-job includes a plurality of user requested modifications.

This timestamping approach is called "site timestamping," in which the timestamping is performed using the time at the storage site, as compared to "source timestamping," in which the timestamping is performed using the time at the source, such as the global time, the time at unit of parallelism performing the parsing function, or the source database 425 from which the ADW load-job was loaded. Source timestamping can result in the same kind of problems as discussed above for begin time and commit time timestamping. "Site timestamping" is different from "system level timestamping" in which a global time, such as the time kept by clock 420a in FIG. 4, is used for timestamping. In one embodiment, site timestamping is not affected by clock drift from one unit of parallelism to another. In one embodiment, a "moving" global clock, i.e., a global clock that changes in sync with time, is used for timestamping.

In one embodiment, the timestamp for all rows affected by a user requested modification is determined based on the primary row modified by the user request. In this context, the "primary row" is the row that is the target of the user requested modification. That is, in one embodiment, the "primary row" is identified using conditions in the requested modification. For example, in the DML statement that is used to transition from Table 4 to Table 5 above, the "primary row" is the only row in Table 4. That row is the target of the DML statement. The use of the term is intended to differentiate such rows from rows that result from application of the temporal modification semantics, such as the second and third rows in Table 5. In one embodiment, such rows are referred to as "related rows."

In one embodiment, the same timestamping value is used for timestamping all of the affected rows, i.e., the primary row and the resulting rows, with the timestamping value being the same for all affected rows except that in one of the rows the timestamping value is inserted in the field designating the beginning of a time period and in the other rows the timestamping value is inserted in the field designating the end of the time period. In one embodiment, the timestamping value is the system time that the primary row is modified.

For example, in one embodiment, if an UPDATE splits a row into three rows in a bi-temporal table (one UPDATE and two INSERTs), the same timestamping value is used for each of the three rows.

In one embodiment, this approach will produce different timestamps for each row within the same ADW load-job, which is different from the traditional approach because the actual commit of the transactions in the ADW load-job has already occurred in the database 425 from which the ADW load-job originates and the ADW load-job is simply loading the transactions into the ADW. In one embodiment, the application or the user orders the modifications in the ADW load-job in the order in which they occurred. In one embodiment, the TransactionTime timestamp will reflect the order in which the user modifications are loaded into the ADW, not necessarily the order that the user modifications occurred. This is upward compatible for ADW workloads, i.e., DSS and operational workloads.

In one embodiment, the above-described timestamping mechanism will apply to all modifications. In one embodiment, this means that all modifications, even those inside transactions, will be tracked temporally. For example, a transaction consisting of two statements such as:
 INSERT a ROW;
 DELETE the inserted row;

will leave a trail in the ADW by producing the resulting rows. In one embodiment, the TransactionTime timestamping value as explained above is dynamic. In one embodiment, the TransactionTime timestamping value is referred to as TT_TIMESTAMP.

In one embodiment, multiple user changes may be made to the same row in the same TransactionTime time granule. In one embodiment, this occurs because of the lack of granularity in the clocks $420a \ldots m$, as shown in FIG. 4. For example, the granularity of one of the clocks, say $420b$ in FIG. 4, may be 0.1 second; that is, the clock $420b$ keeps time with resolution down to a tenth of a second. That is not to say that the time is accurate to that level to an impartial standard. The clock $420b$ may have drifted with respect to such an impartial standard so that its accuracy is not as fine as its granularity.

In one embodiment, the system creates a finer granularity time than is available from the system. In one embodiment, if multiple changes are made to the same row within the same TransactionTime time granule, the system generates an artificially finer granular time by, for example, incrementing the microsecond portion (i.e., the last 3 digits) of the TIMESTAMP data type. In one embodiment, this allows multiple updates within the same time granule of the system clock. In one embodiment, this form of increment is performed for all modifications regardless of the utility or mechanism used for the modification. In one embodiment, if the incremented value overflows into the next granule, that is, for example, if more than 1000 modifications to a row occur within a 10 ms period, then the transaction is aborted.

In one embodiment the transaction will be aborted if the TransactionTime End Time becomes less than the TransactionTime Begin Time, which can happen if the clock is adjusted backwards in time.

ValidTime Timestamping

In one embodiment, the system, such as system 405, sometimes determines the ValidTime timestamping value for CURRENT modifications. In one embodiment, the user is permitted to specify the ValidTime timestamping value for current forms of INSERT. In one embodiment, if the user does not specify a value, it defaults to TEMPORAL_TS to UNTIL_CHANGED.

In one embodiment, the user does not specify the ValidTime timestamp value for any other form of current modification. In one embodiment, it is not possible for the user to specify the ValidTime timestamp value for current DELETE, current UPDATE, current UPSERT, and current MERGE. In one embodiment, the ValidTime timestamping value for these forms of current modifications defaults to TEMPORAL_TS to UNTIL_CHANGED.

In one embodiment, when the system defaults the ValidTime timestamping value it is fixed during the life of the transaction. This is different from what was described above for TransactionTime timestamping. This is because of the issues of: (a) atomicity; (b) the ability for a transaction to see its own modification made earlier in the transaction; (c) getting the same result when a query is issued twice in the same transaction without any intermediate modifications to the database.

In one embodiment, the fixed ValidTime timestamping value is the commit time of the transaction. This has implications for performance because the row must be revisited to adjust the timestamping value. Furthermore, readers (ADW workloads) of ADW rows that are locked for access (i.e., exclusive access processes are locked out) will get inconsistent read results with commit timestamping. That is, if an access locked ADW row is read between its start time and its commit time, which is allowed because of the access lock, resulting potentially in the same kind of issues described above in the discussion of begin-time and end-time timestamping with Transactions 1, 2, 3, and 4. In one embodiment, the time (e.g., provided by the TEMPORAL_TS functions discussed above) when the first SQL non-locking step (i.e., the first transaction step issued affecting a row after an access lock is removed from that row) is dispatched to the unit of parallelism (e.g., Teradata AMP) is used as the fixed timestamping value for modifications.

In one embodiment, the ValidTime timestamp is specified by the user. That is, in one embodiment, the ValidTime timestamp value is not allowed to default. ValidTime models the user world. Therefore, only the user can determine the correct value for ValidTime. Therefore, in one embodiment, the ValidTime timestamp is specified by the user in all current forms of INSERT. Note that, in one embodiment, it is not necessary for the user to specify the CURRENT form as that form is typically a system default.

In one embodiment, for a bi-temporal table, the user application considers the TransactionTime value in determining the appropriateness of the result row. In one embodiment, the TransactionTime values show when the row was actually made available in the database. For example, when considering whether a row is an appropriate response to a query, the ADW system would generally look at the ValidTime dimension to execute a time-related predicate. In one embodiment, the ADW system would also consider the TransactionTime dimension to resolve any timestamping issues with the ValidTime dimension as a result of, for example, the issues discussed above.

In one embodiment, any read inconsistency problem for read locks is avoided by having the locks on all accessed objects within the transaction acquired before any SQL statement is issued.

Figure 5:
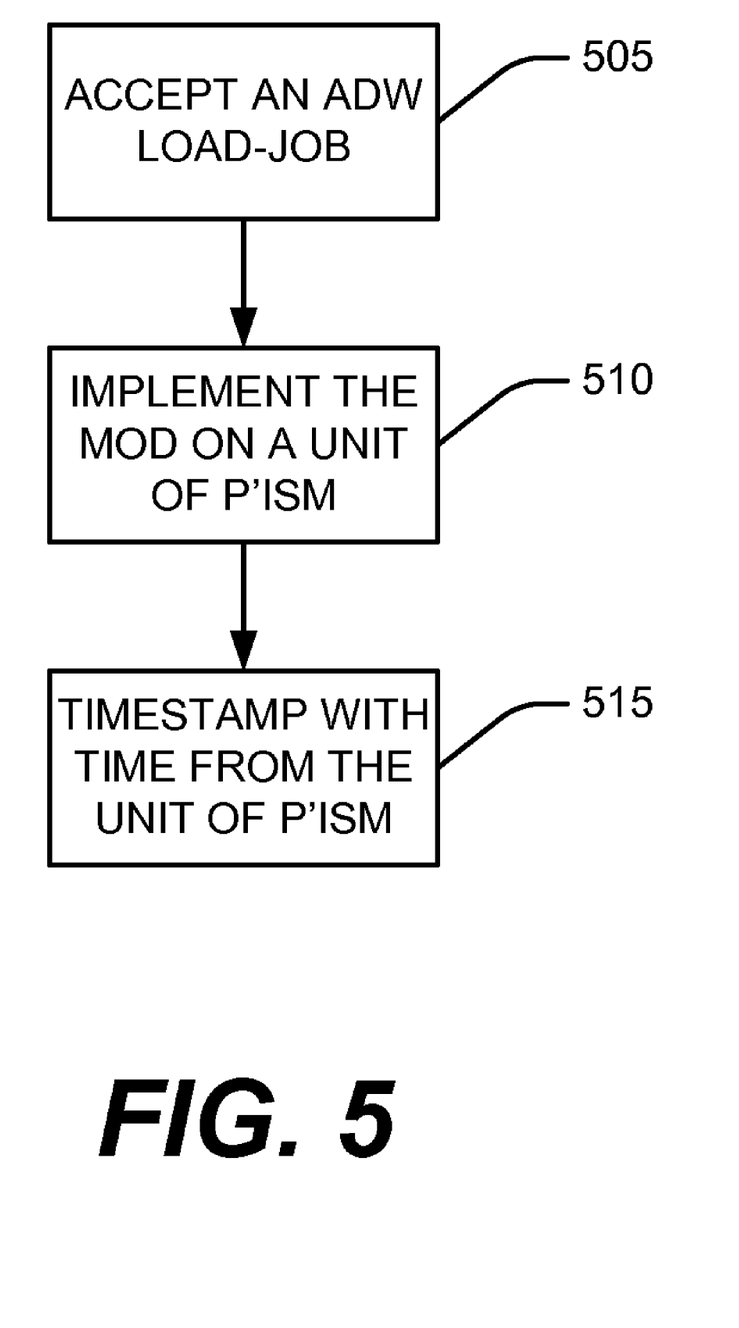
FIG. 5 is a flow chart.

In one embodiment of the operation of the technique herein, as shown in FIG. 5, the ADW accepts an ADW load-job (block 505). In one embodiment, the load-job includes a requested modification to an identified row. The modification can be an INSERT, a DELETE, an UPDATE, or an UPSERT or any similar operations. The identified row is stored on one of the units of parallelism, such as units of parallelism $410a \ldots m$ shown in FIG. 4. In one embodiment, the requested modification is one of a series in a transaction contained, in whole or in part, in the ADW load-job. In one embodiment, the requested modification is any of the modifications except the last modification in the transaction.

In one embodiment, the technique further includes implementing the requested modification on the identified row (block 510).

In one embodiment, the technique further includes timestamping the identified row with the system time maintained by the unit of parallelism where the identified row is stored at the time of implementation of the modification (block 515). For example, if the identified row is stored on unit of parallelism 410c, the identified row would be timestamped with the time of implementation of the modification according to the clock 420c that is associated with that unit of parallelism 410c.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
accepting a load-job for an active data warehouse ("ADW") on a massively parallel processing system ("MPP system"), the MPP system comprising a plurality of units of parallelism, each of the plurality of units of parallelism maintaining its own moving system time separate from that of the other units of parallelism, the load-job including (a) a requested modification to a first identified row in a first temporal table, the first temporal table comprising rows stored in each of the plurality of units of parallelism, the first identified row being stored in the first temporal table on a first of the MPP system's units of parallelism, and (b) a requested modification to a second identified row in a second temporal table, the second temporal table comprising rows stored in a plurality of the plurality of units of parallelism, the second identified row being stored in the second temporal table on a second of the MPP system's units of parallelism;
implementing the requested modifications on the first identified row and the second identified row;
timestamping the first identified row with the moving system time maintained by the first of the MPP system's units of parallelism at the time of the implementation of the modification to the first identified row; and
timestamping the second identified row with the moving system time maintained by the second of the MPP system's units of parallelism at the time of the implementation of the modification to the second identified row; wherein
accepting the requested modification comprises:
accepting multiple modifications to the first identified row within a time less than a finest granularity provided by the system time maintained by the first of the MPP system's units of parallelism; and
generating an artificial finer granularity for the system time maintained by the first of the MPP system's units of parallelism to use as respective time stamps for successive modifications of the multiple modifications to the first identified row within a time less than the finest granularity available from the system time maintained by the first of the MPP system's units of parallelism.

2. The method of claim 1 wherein:
timestamping the first identified row with the moving system time maintained by the first of the MPP system's units of parallelism at the time of the implementation of the modification comprises inserting the moving system time maintained by the first of the MPP system's units of parallelism into a TransactionTime column of the first identified row.

3. The method of claim 2 wherein the first temporal table is bi-temporal, having the TransactionTime dimension and a ValidTime dimension, the ValidTime dimension recording the time period when a row in the first temporal table is valid, the method further comprising:
executing a query against the first temporal table, the query including a predicate to be applied to the ValidTime dimension; and
applying the predicate to the TransactionTime dimension.

4. The method of claim 3 wherein applying the predicate to the TransactionTime dimension is performed to resolve issues occurring when applying the predicate to the ValidTime dimension.

5. The method of claim 2 wherein inserting the moving system time maintained by the first of the MPP system's units of parallelism into a TransactionTime dimension of the first identified row comprises:
inserting the moving system time maintained by the first of the MPP system's units of parallelism into a begin time field of the TransactionTime dimension of the first identified row.

6. The method of claim 2 wherein inserting the moving system time maintained by the first of the MPP system's units of parallelism into a TransactionTime dimension of the first identified row comprises:
inserting the moving system time maintained by the first of the MPP system's units of parallelism into an end time field of the TransactionTime dimension of the first identified row.

7. The method of claim 1 wherein the first temporal table comprises a ValidTime dimension and wherein:
the requested modification is required to include an entry for the ValidTime dimension.

8. The method of claim 1 wherein the temporal table is bi-temporal having a TransactionTime field, the method further comprising:
identifying the first identified row using the TransactionTime field.

9. A database system comprising:
a massively parallel processing system ("MPP system"), the MPP system comprising:
a plurality of units of parallelism, each of the plurality of units of parallelism maintaining its own moving system time separate from that of the other units of parallelism;
a plurality of CPUs, each of the units of parallelism providing access to one or more CPUs;
a plurality of virtual processes, each of the one or more CPUs providing access to one or more virtual processes;
each virtual process configured to manage data, including rows from the set of database table rows, stored in one of a plurality of data-storage facilities;
a process to:
accept a load-job for an active data warehouse (ADW), the load job including (a) a requested modification a first identified row in a first temporal table, the first temporal table comprising rows stored in each of the plurality of units of parallelism, the first identified row being stored in the first temporal table on a first of the MPP system's units of parallelism, and (b) a requested modification to a second identified row in a second temporal table, the second temporal table comprising rows stored in a plurality of the plurality of units of parallelism, the second identified row being stored in the second temporal table on a second of the MPP system's units of parallelism;
implement the requested modifications on the first identified row and the second identified row;
timestamp the first identified row with the moving system time maintained by the first of the MPP system's units of parallelism at the time of the implementation of the modification to the first identified row; and
timestamp the second identified row with the moving system time maintained by the second of the MPP system's units of parallelism at the time of the implementation of the modification to the second identified row; wherein
accepting the requested modification comprises:
accepting multiple modifications to the first identified row within a time less than a finest granularity provided by the system time maintained by the first of the MPP system's units of parallelism; and generating an artificial finer granularity for the system time maintained by the first of the MPP system's units of parallelism to use as respective time stamps for successive modifications of the multiple modifications to the first identified row within a time less than the finest granularity available from the system time maintained by the first of the MPP system's units of parallelism.

10. The database system of claim 9 wherein:
timestamping the first identified row with the moving system time maintained by the first of the MPP system's units of parallelism at the time of the implementation of the modification comprises inserting the moving system time maintained by the first of the MPP system's units of parallelism into a TransactionTime column of the first identified row.

11. The database system of claim 10 wherein the first temporal table is bi-temporal, having the TransactionTime dimension and a ValidTime dimension, the ValidTime dimension recording the time period when a row in the first temporal table is valid, the method further comprising:
executing a query against the first temporal table, the query including a predicate to be applied to the ValidTime dimension; and
applying the predicate to the TransactionTime dimension.

12. The database system of claim 11 wherein applying the predicate to the TransactionTime dimension is performed to resolve issues occurring when applying the predicate to the ValidTime dimension.

13. A computer program, stored in a non-transitory computer-readable tangible medium, the program comprising executable instructions that cause a computer to:
accept a load-job for an active data warehouse ("ADW") on a massively parallel processing system ("MPP system"), the MPP system comprising a plurality of units of parallelism, each of the plurality of units of parallelism maintaining its own moving system time separate from that of the other units of parallelism, the load-job including (a) a requested modification a first identified row in a first temporal table, the first temporal table comprising rows stored in each of the plurality of units of parallelism, the first identified row being stored in the first temporal table on a first of the MPP system's units of parallelism, and (b) a requested modification to a second identified row in a second temporal table, the second temporal table comprising rows stored in a plurality of the plurality of units of parallelism, the second identified row being stored in the second temporal table on a second of the MPP system's units of parallelism;
implement the requested modifications on the first identified row and the second identified row;
timestamp the first identified row with the moving system time maintained by the first of the MPP system's units of parallelism at the time of the implementation of the modification to the first identified row; and
timestamp the second identified row with the moving system time maintained by the second of the MPP system's units of parallelism at the time of the implementation of the modification to the second identified row; wherein
when accepting the requested modification, the computer:
accepts multiple modifications to the first identified row within a time less than a finest granularity provided by the system time maintained by the first of the MPP system's units of parallelism; and
generates an artificial finer granularity for the system time maintained by the first of the MPP system's units of parallelism to use as respective time stamps for successive modifications of the multiple modifications to the first identified row within a time less than the finest granularity available from the system time maintained by the first of the MPP system's units of parallelism.

14. The computer program of claim 13 wherein:
timestamping the first identified row with the moving system time maintained by the first of the MPP system's units of parallelism at the time of the implementation of the modification comprises inserting the moving system time maintained by the first of the MPP system's units of parallelism into a TransactionTime column of the first identified row.

15. The computer program of claim 14 wherein the first temporal table is bi-temporal, having the TransactionTime dimension and a ValidTime dimension, the ValidTime dimension recording the time period when a row in the first temporal table is valid, the computer program further comprising executable instructions that cause the computer to:
execute a query against the first temporal table, the query including a predicate to be applied to the ValidTime dimension; and
apply the predicate to the TransactionTime dimension.

16. The computer program of claim 15 wherein applying the predicate to the TransactionTime dimension is performed to resolve issues occurring when applying the predicate to the ValidTime dimension.

17. The method of claim 1 further comprising:
modifying an affected row on one of the MPP system's units of parallelism that is not the first of the MPP system's units of parallelism as a result of implementing the requested modification on the first identified row; and
timestamping the affected row with the moving system time maintained by the first of the MPP system's units of parallelism at the time of the modification to the first identified row.

* * * * *

UNITED STATES PATENT AND TRADEMARK OFFICE
CERTIFICATE OF CORRECTION

PATENT NO. : 8,346,714 B1  
APPLICATION NO. : 12/640103  
DATED : January 1, 2013  
INVENTOR(S) : Bhashyam Ramesh et al.

Page 1 of 1

It is certified that error appears in the above-identified patent and that said Letters Patent is hereby corrected as shown below:

Title Page, Item (73) Assignee: "Teradota US, Inc." should read -- Teradata US, Inc. --

Signed and Sealed this
Twelfth Day of March, 2013

Teresa Stanek Rea
*Acting Director of the United States Patent and Trademark Office*